Oct. 8, 1957  T. F. CARLSON  2,809,049
STEERING GEAR IDLER ARM ASSEMBLIES
Filed Oct. 1, 1956

INVENTOR.
Theodore F. Carlson
BY
Enloe Wilkinson
ATTORNEY

United States Patent Office 2,809,049
Patented Oct. 8, 1957

2,809,049

STEERING GEAR IDLER ARM ASSEMBLIES

Theodore F. Carlson, Englewood, Colo.

Application October 1, 1956, Serial No. 613,184

6 Claims. (Cl. 280—95)

This invention relates to improvements in steering gear idler arm assemblies of the general type shown in United States Patent No. 2,689,756.

The steering mechanism of most motor vehicles consists of a steering shaft having a crank arm at its lower end. A drag link connects the crank arm to steering and tie rods which are connected to the wheel mountings. The steering shaft and crank arm are positioned at the left side of the vehicle and the idler arm, which is secured to the frame at the right side of the vehicle, supports the right end of the drag link.

It is an object of this invention to provide an idler arm assembly for motor vehicles which operates freely and which absorbs road shocks.

Another object is to provide an idler assembly which operates silently and does not bind.

It is a further object to provide an idler arm assembly which eliminates friction and the wear resulting therefrom.

Another object is to provide an idler arm assembly wherein grease is sealed in and dirt and moisture are prevented from entering.

It is another object to provide an idler arm assembly which retains the accurate alignment and setting of the front wheels of a vehicle.

It is a further object to provide an idler arm assembly which is economical to manufacture and which may be quickly and easily installed.

With these and various other objects in view, the invention may consist of certain novel features, as will be more fully described and particularly pointed out in the specification, drawings and claims appended hereto.

In the drawings, in which like reference characters are used to designate like parts—

Figure 3:
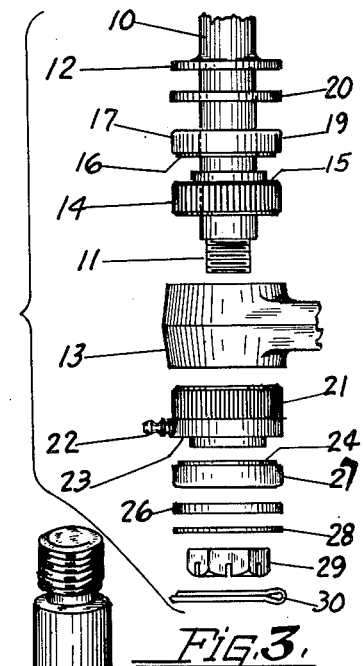
Figure 3 is a reduced exploded view showing the several elements detached from each other and in the relationship shown in Figure 2.
Figure 1:
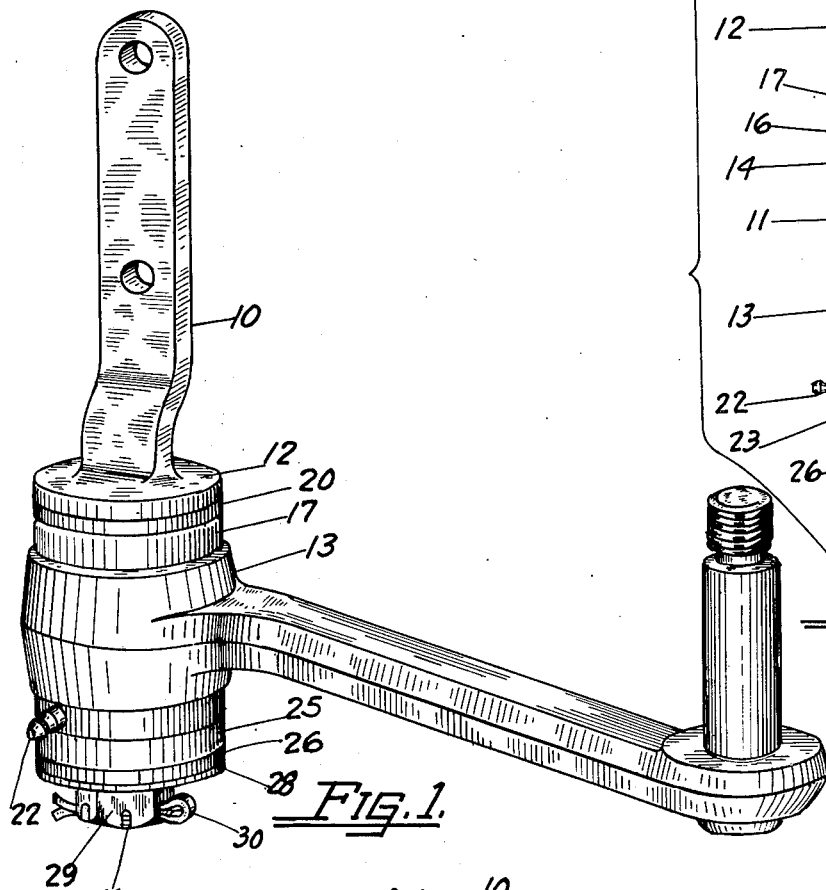
Figure 1 is a perspective view of the idler arm assembly including the supporting bracket.
Figure 2:
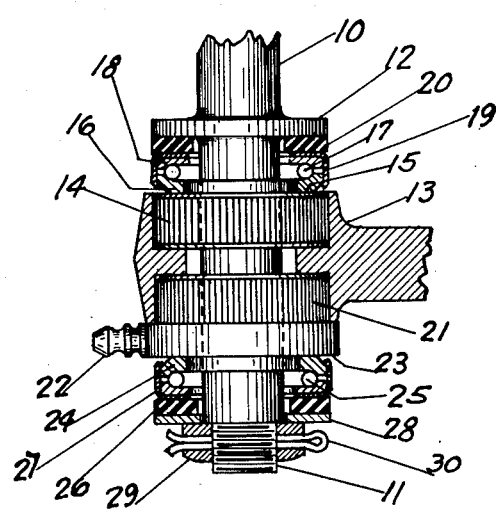
Figure 2 is a side elevation partly in cross-section showing the pivotal connection between the idler arm and spindle.

Referring to the drawings more in detail, the bracket 10, is adapted to be secured to the chassis of a motor vehicle and has a downwardly extending spindle which terminates in a threaded portion adjacent its lower end. A peripheral flange or rib is positioned above the threaded portion 11 of the spindle and below the bracket 10. The larger end of the idler arm 13 is provided with an axial opening to receive the spindle upon which it is mounted for axial movement.

An upper sleeve 14 is mounted on the spindle above the idler arm 13 and has a knurled lower outer periphery which fits into the upper portion of the opening in the idler arm. The knurled portion of the sleeve is pressed into the opening in the idler arm resulting in a tight press or friction so that the sleeve is movable with the idler arm. The upper portion of the sleeve 14 is inwardly offset providing a shoulder portion 15 on which the lower race 16 of the upper ball bearing or thrust bearing assembly 17 is seated. The ball bearing or thrust bearing assembly consists of upper and lower ball races 18 and 16 respectively which are held in place by a cup 19.

The elastic or resilient bushing 20 is preferably made of an oil and grease resistant material which may be compressed and which tends to retain its original shape. This bushing is positioned on the spindle between the rib 12 and the upper surface of the bearing assembly 17.

The lower sleeve 21 has a knurled upper outer periphery similar to that of the upper sleeve 14, which portion of the sleeve is installed in the lower portion of the opening in idler arm 13 in the same manner as described in connection with the upper sleeve 14. The lower sleeve is provided with a grease nipple 22 positioned below the knurled portion. The lower portion of the sleeve is inwardly offset providing a shoulder portion 23 which is engaged by the upper surface 24 of the lower ball bearing assembly 25. The construction of the upper and lower ball bearing assemblies is the same but their positions are reversed.

The lower resilient bushing 26 is the same as the upper resilient bushing 20 and is positioned on the spindle below the under surface 27 of the lower ball bearing assembly 25. A washer 28 is positioned on the spindle below resilient bushing 26. A nut 29 is threaded to the lower portion of the spindle below the washer 28. As the nut 29 is tightened against the washer 28, the upper and lower resilient bushings 20 and 26 will be compressed. It is apparent that any looseness that might develope in the assembly as a result of wear will be compensated for by the expansion of the compressed resilient bushings.

In view of the foregoing description taken in conjunction with the accompanying drawings it is believed that a clear understanding of the invention will be quite apparent to those skilled in the art.

Although only one form of the invention has been illustrated and described, it will be apparent to those skilled in the art that various modifications may be made without departing from the spirit of the invention or the scope of the appended claims.

What is claimed is:

1. A steering gear idler arm assembly comprising a mounting bracket for securing said assembly to the chassis of a motor vehicle, a spindle portion extending downwardly from said bracket and having a threaded portion adjacent its lower end and a peripheral rib adjacent its upper end, an idler arm having an axial opening rotatably mounted on said spindle portion, an upper sleeve mounted on said spindle portion having a knurled lower outer periphery and the upper portion of said sleeve being inwardly offset to provide a shoulder portion, said knurled periphery being pressed into the upper portion of the opening in the idler arm, an upper ball bearing assembly mounted on said spindle portion having an upper and lower ball race, said lower ball race being seated on the shoulder portion of said upper sleeve, an upper resilient bushing mounted on said spindle portion between said peripheral rib and the upper race of said upper ball bearing assembly, a lower sleeve mounted on said spindle portion having a knurled upper outer periphery, the lower portion of said sleeve being inwardly offset to provide a shoulder portion, said knurled periphery being pressed into the lower portion of the opening in the idler arm, a lower ball bearing assembly mounted on said spindle portion having an upper and lower ball race, said upper race being seated on the shoulder portion of said lower sleeve, a lower resilient bushing mounted on said spindle portion between the lower end of said spindle portion and the lower ball bearing assembly, a washer positioned on said spindle portion between said lower resilient bushing and the lower threaded end of said spindle portion and a nut threaded to the lower threaded portion of said spindle portion for compressing said upper and lower resilient bushings.

2. A steering gear idler arm assembly comprising a spindle adapted to be secured to the chassis of a motor vehicle having a threaded portion adjacent its lower end and a peripheral rib adjacent its upper end, an idler arm having an axial opening rotatably mounted on said spindle, an upper sleeve mounted on said spindle having a knurled lower outer periphery and the upper portion of said sleeve being inwardly offset to provide a shoulder portion, said knurled periphery being pressed into the upper portion of the opening in the idler arm, an upper ball bearing assembly mounted on said spindle and being seated on the shoulder portion of said upper sleeve, an upper resilient bushing mounted on said spindle between said peripheral rib and said upper ball bearing assembly, a lower sleeve mounted on said spindle having a knurled upper outer periphery, the lower portion of said sleeve being inwardly offset to provide a shoulder portion, said knurled periphery being pressed into the lower portion of the opening in the idler arm, a lower ball bearing assembly mounted on said spindle and being seated on the shoulder portion of said lower sleeve, a lower resilient bushing mounted on said spindle between the lower end thereof and said lower ball bearing assembly and means threaded to the lower portion of said spindle for compressing said upper and lower resilient bushings.

3. A steering gear idler arm assembly comprising a spindle adapted to be secured to the chassis of a motor vehicle having a peripheral rib adjacent its upper end, an idler arm having an axial opening rotatably mounted on said spindle, an upper sleeve mounted on said spindle having its upper portion inwardly offset to provide a shoulder portion and the lower portion of said sleeve being positioned within the upper portion of the opening in the idler arm, an upper ball bearing assembly mounted on said spindle and being seated on the shoulder portion of said upper sleeve, an upper resilient bushing positioned on said spindle between said peripheral rib and said upper ball bearing assembly, a lower sleeve mounted on said spindle having its lower portion inwardly offset to provide a shoulder portion and the upper portion of said sleeve being positioned within the lower portion of the opening in the idler arm, a lower ball bearing assembly mounted on said spindle and being seated on the shoulder portion of said lower sleeve, a lower resilient bushing positioned on said spindle between the lower end thereof and the lower ball bearing assembly and means engaging the lower portion of said spindle for compressing said upper and lower resilient bushings.

4. A steering gear idler arm assembly comprising a spindle adapted to be secured to the chassis of a motor vehicle, an idler arm having an axial opening mounted on said spindle, an upper sleeve mounted on said spindle having a knurled lower outer periphery pressed into the upper portion of the opening in the idler arm, an upper ball bearing assembly mounted on said spindle and seated on said upper sleeve, an upper resilient bushing mounted on said spindle having its under surface in engagement with the upper surface of said upper ball bearing assembly, a lower sleeve mounted on said spindle having a knurled upper outer periphery pressed into the lower portion of the opening in the idler arm, a lower ball bearing assembly mounted on said spindle having its upper surface in engagement with said lower sleeve, a lower resilient bushing mounted on said spindle having its upper surface in engagement with said lower ball bearing assembly and means on said spindle above said upper and below said lower resilient bushings for compressing said bushings.

5. A steering gear idler arm assembly comprising a spindle adapted to be secured to the chassis of a motor vehicle, an idler arm rotatably mounted on said spindle, an upper sleeve mounted on said spindle having a knurled outer periphery pressed into the upper portion of said idler arm, an upper bearing assembly mounted on said spindle and having its under surface in engagement with said upper sleeve, a lower sleeve mounted on said spindle having a knurled outer periphery pressed into the under portion of said idler arm, a lower bearing assembly mounted on said spindle having its upper surface in engagement with said lower sleeve and means on said spindle above said upper bearing assembly and below said lower bearing assembly for maintaining the relative positions of said sleeves and bearings with respect to said idler arm.

6. A steering gear idler arm assembly comprising a spindle adapted to be secured to the chassis of a motor vehicle, an idler arm rotatably mounted on said spindle, an upper sleeve mounted on said spindle having its upper portion inwardly offset to provide a shoulder portion and the lower portion of said sleeve being positioned within the upper portion of said idler arm, an upper bearing assembly mounted on said spindle and being seated on the shoulder portion of said upper sleeve, a lower sleeve mounted on said spindle having its lower portion inwardly offset to provide a shoulder portion and the upper portion of said sleeve being positioned within the lower portion of said idler arm, a lower bearing assembly mounted on said spindle and being seated on the shoulder portion of said lower sleeve and means on said spindle above said upper bearing assembly and below said lower bearing assembly for maintaining the relative positions of said sleeves and bearings with respect to said idler arm.

References Cited in the file of this patent

UNITED STATES PATENTS

| 1,697,319 | Mackenzie | Jan. 1, 1929 |
| 1,977,450 | Mitchell | Oct. 16, 1934 |
| 2,428,086 | Leighton | Sept. 30, 1947 |
| 2,544,582 | Booth | Mar. 6, 1951 |
| 2,613,091 | Funnell | Oct. 7, 1952 |
| 2,676,028 | Cook | Apr. 20, 1954 |
| 2,689,756 | Carlson | Sept. 21, 1954 |

FOREIGN PATENTS

| 283,965 | Switzerland | Nov. 1, 1952 |